United States Patent Office 2,871,072
Patented Jan. 27, 1959

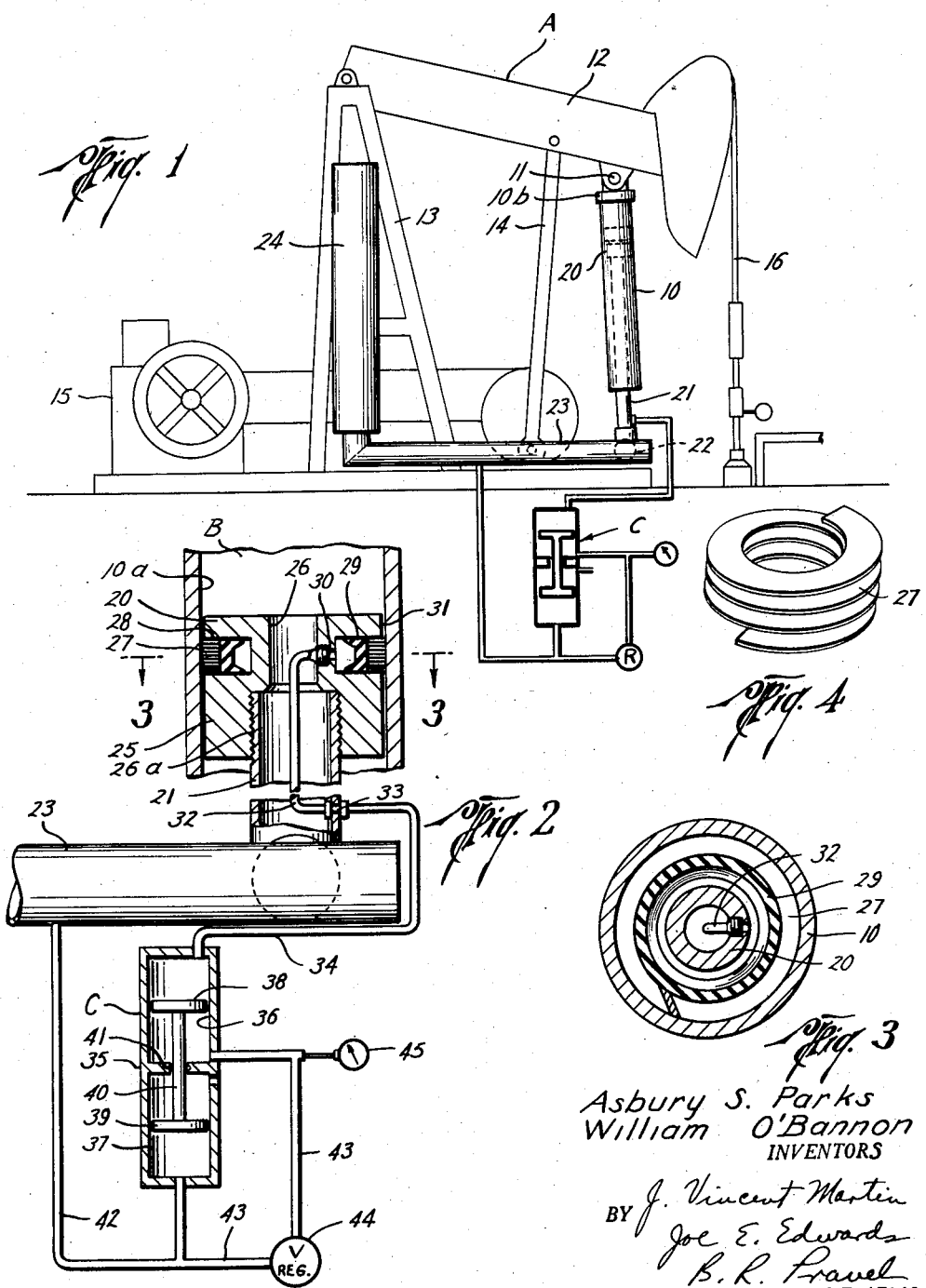

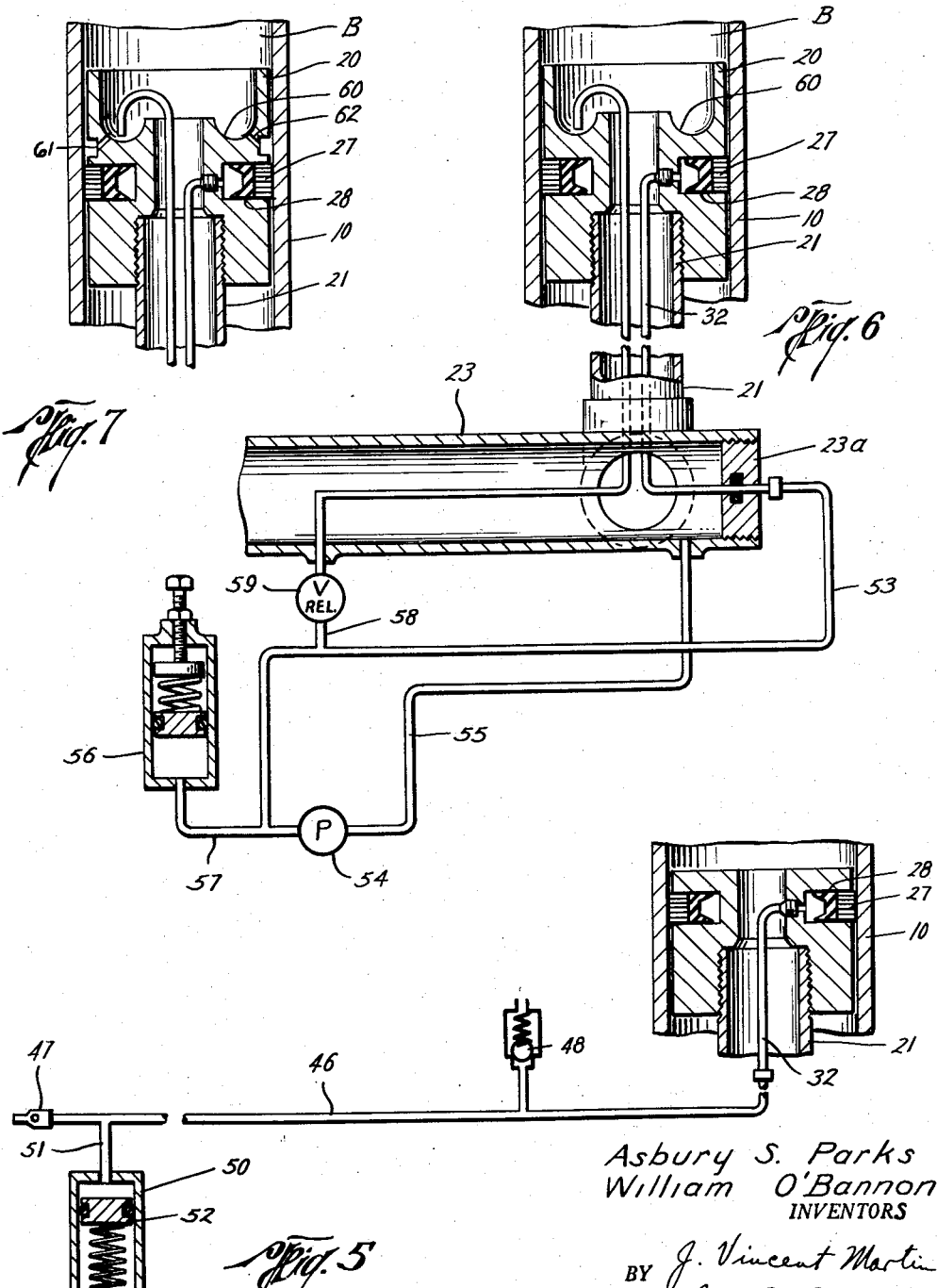

2,871,072

PISTON SEALING ASSEMBLIES

Asbury S. Parks and William O'Bannon, Houston, Tex.; said O'Bannon assignor to Parkersburg-Aetna Corporation, Houston, Tex., a corporation of West Virginia Application July 15, 1954, Serial No. 443,604

4 Claims. (Cl. 309—31)

This invention relates to new and useful improvements in piston sealing assemblies.

The invention is applicable to any piston for effecting an efficient seal between the piston and the wall of the cylinder within which the piston is reciprocable, but has been found particularly applicable to the piston of a counterbalancing unit such as is generally employed in well pumping units.

One object of the invention is to provide an improved piston sealing assembly wherein a sealing means on the piston is maintained in sealing contact with the sealing wall by an internal pressure which acts against said sealing means and which is superior to the working pressure acting against the piston, whereby an efficient seal between the piston and cylinder is assured.

An important object is to provide a piston sealing assembly wherein a seal ring is mounted upon the piston and has its external periphery engaging the cylinder wall, together with means for directing a pressure against the internal periphery of said ring to urge the same radially outwardly into sealing engagement with the cylinder wall, the pressure acting upon the ring internally thereof being greater than the pressure which acts upon and is sealed by the piston so that the force urging the ring into sealing contact is greater than the force of the pressure which is tending to pass the piston as the latter moves within the cylinder, whereby effective sealing is accomplished.

Still another object is to provide a piston sealing assembly, of the character described, wherein the superior pressure which acts internally of the sealing means may be a controlled pressure from any source or may be a pressure which utilizes the working pressure which normally acts upon the piston in combination with an additional pressure; in the latter instance, any variations in the working pressure are automatically compensated for, since the superior pressure acting on the sealing means includes said working pressure.

A further object is to provide a piston sealing assembly wherein a pressure fluid is applied internally of the sealing means and also wherein the apparatus includes a means to compensate for expansion and contraction of the pressure fluid as caused by temperature variations.

Still another object is to provide an assembly of the character described, wherein fluid having lubricating qualities is employed as the pressure transmitting means for applying internal pressure to the sealing means and also wherein said fluid is utilized to lubricate the piston as it reciprocates within its cylinder.

A particular object is to provide an improved sealing means for pistons which may include a sealing element constructed of a material having a low coefficient of friction in combination with a resilient pressure-responsive packing ring; said element comprising either a plurality of superposed annular rings or a generally helical member which, when collapsed, provides the effect of a plurality of rings, said helical design facilitating the application and removal of the sealing element to and from the piston.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 1 is a schematic view of a piston sealing assembly constructed in accordance with the invention and illustrating the same applied to a pumping unit;

Figure 2 is a partial sectional view of the piston having the improved sealing means thereon and also illustrating the control apparatus which controls the application of internal pressure to the sealing means;

Figure 3 is a horizontal cross-sectional view, taken on the line 3—3 of Figure 2;

Figure 4 is an isometric view of a preferred form of sealing element;

Figure 5 is a partial sectional view of a modified form of the invention;

Figure 6 is a sectional view of another form of the invention, wherein a portion of pressure fluid may be utilized as a lubricant for the piston; and Figure 7 is a vertical sectional view of the piston shown in Figure 6 and illustrating a pressure-relief means incorporated therein.

In the drawings, the numeral 10 designates a cylinder which is illustrated as a part of the usual fluid counterbalancing means of a well pumping unit A. The cylinder is pivotally attached at 11 to the walking beam 12 of the pumping unit and is reciprocated in a substantially vertical plane when the walking beam is operated. The pumping unit is schematically illustrated and includes the usual supporting frame 13 on which the beam is mounted for swinging movement and the operating rod or pitman 14 which is actuated by any suitable prime mover 15. As is well known, the pump rods 16 have their upper ends attached to the walking beam, and, as said beam is operated, the pump rods are reciprocated to perform the pumping operation. The counterbalancing assembly of which the cylinder 10 is a part is employed for counterbalancing the weight of the pump rods 16 during the downstroke.

Co-acting with the cylinder 10 is a piston 20, which is disposed within the bore 10a of the cylinder and which is attached to a tubular support 21. The lower end of the support 21 is mounted for a limited swinging movement at point 22, but, for all practical purposes, the support and piston are stationary, whereby the cylinder may reciprocate with respect thereto. The lower end of the bore of the tubular support 21 is in communication with one end of conduit 23, the other end of which communicates with a volume chamber or tank 24. Air or other fluid under a predetermined pressure is introduced into the volume chamber 24 and may flow through the conduit 23 and then upwardly through the tubular support 21.

The construction of the piston 20 is clearly illustrated in Figure 2, and said piston comprises a generally cylindrical body 25 having an axial bore 26 extending there-through. The lower portion of the bore 26 is counterbored at 26a and is threaded to receive the upper end of the tubular support 21. With this construction the air or other fluid under pressure within the volume tank 24 and conduit 23 may pass upwardly through the axial bore 26 of the piston into the area B, which is between the upper end of the piston and the closed upper end 10b of the cylinder. Since the fluid pressure is confined between the closed upper end of the cylinder and the upper end of the piston, the pressure of the fluid in the area B acts against the piston to resist telescoping movement of the cylinder with respect to the piston; in order for the cylinder to move downwardly, the fluid within the area B must be forced downwardly through the tubular support 21 and back into the volume chamber 24, and obviously, the particular pressure of the fluid will control the counterbalancing action. It might be noted that this arrangement comprises a standard type of fluid balancing unit.

Ordinarily, the piston body 25 carries a piston ring of usual construction, which ring is in engagement with the wall of the cylinder and is maintained in sealing position merely by the inherent flexibility of the ring. It has been found that leakage past the usual ring occurs particularly where higher fluid pressures counterbalancing heavier loads are employed. The lower end of the cylinder 10 is open to atmosphere, and, thus, any leakage of pressure past a piston ring on the piston body 25 results in an escape of the pressure fluid which performs the counterbalancing operation.

In carrying out the present invention, an improved sealing assembly is employed, and such assembly is clearly shown in Figure 2. The assembly includes a sealing element 27 which is disposed within the outer portion of an annular groove 28 formed in the piston body. The sealing element 27 may be constructed of any suitable sealing material and may, for example, be a continuous annular ring having inherent resilience such as one constructed of graphite filled with rubber compounds. However, a preferred form of sealing element is illustrated and is constructed of "Teflon" or similar material which has a low coefficient of friction. The sealing element may consist of a plurality of superposed rings, but is preferably constructed of a continuous member in the form of a helix or spiral, as illustrated in Figure 4. This construction facilitates the insertion and removal of the element 27 within the groove 28, and, when in position, gives the effect of a plurality of superposed rings. Although "Teflon" or similar material having a low coefficient of friction is flexible to a degree, it does not have the inherent elasticity of rubber, and, to assure that the element 27 may be urged into tight sealing contact with the wall 10a of the cylinder, an elastic pressure-seal ring 29 is disposed within the groove 28 behind the element 27. A pressure inlet port 30 extends from the bore 26 of the piston body into the groove 28, so that a pressure may be applied against the elastic ring 29 which will urge the sealing element 27 into sealing engagement with the cylinder wall.

The pressure which is introduced into the groove 28 is greater than the fluid pressure which is confined in the area B. Obviously, the fluid pressure acting against the upper end of the piston is tending to by-pass the piston through the annular space 31 between the piston and the wall of the cylinder; therefore, this pressure is attempting to pass around the exterior periphery of the sealing element 27. By applying an internal pressure within the groove 28 which is greater than the pressure which is attempting to pass the sealing element, said sealing element is held in sufficiently tight sealing engagement with the cylinder wall to prevent leakage. In other words, the force which is exerted against the sealing element by the pressure applied internally thereof is superior to the force of the working presure in area B, and an efficient seal which prevents any leakage of the working pressure past the sealing element is assured.

The pressure which is supplied to the groove 28 is conducted thereto by a tube 32 which has one end connected to the inlet port 30 and its opposite end connected to a coupling 33 which extends through the wall of the support 21. The source of the pressure which is directed to the tube 32 is subject to variation, and in Figure 2 one manner of providing a pressure to the groove 28 is illustrated. In this form the coupling 33 has connection with a supply line 34, and the opposite end of the said line communicates with a pressure amplifying device C. The device C comprises a housing 35 which includes an upper cylinder 36 and a lower cylinder 37. A piston 38 is movable within cylinder 36, while a piston 39 is movable within the cylinder 37; a piston rod 40 connects the pistons 38 and 39 so that the pistons move simultaneously, and the cylinders are sealed from each other by packing 41 which surrounds the connecting rod.

The pressure fluid from conduit 23 is conducted to the lower end of the cylinder 37 through a conductor 42 so that this presure is acting against piston 39 to move said piston upwardly. A suitable liquid, such as oil, is present in the upper portion of cylinder 36 and also fills the supply line 34, tube 32 and groove 28, and, thus, when pressure from conduit 23 acts upon the piston 39, a force is exerted against the liquid in the groove 28, such force being transmitted to the sealing element 27. Since the pressure which is acting on the piston 39 is the working pressure acting against the main piston 20, it is evident that sealing element 27 will be urged outwardly into sealing engagement with the same force that is acting in the annulus 31 between the main piston and cylinder.

To create a superior pressure within groove 28, a by-pass conductor 43 extends from conductor 42 and has its opposite end in communication with the area below the upper piston 38 of the device C. A regulator 44 regulates the amount of pressure which enters cylinder 36, such pressure being indicated by gauge 45. Because pistons 38 and 39 are connected together, it is obvious that additional pressure applied to piston 38 will result in an increased pressure being applied to the liquid in lines 34 and 32 and in groove 28. By controlling the regulator any predetermined superior pressure may be applied to the sealing element 27.

As an example, let it be presumed that the working pressure of the fluid in the system is two hundred (200) pounds. This would be the pressure in the area B above the main piston 20 and would also be the pressure acting against piston 39 of the amplifying device C. Assuming the regulator to be set at fifty (50) pounds, then fifty (50) additional pounds pressure will be directed against piston 38, so that the composite pressure acting against the liquid in groove 28 will be two hundred and fifty (250) pounds. Under these assumed pressures the sealing element 27 is urged outwardly into sealing engagement by a pressure which is greater by fifty (50) pounds than the pressure which is attempting to escape past the sealing element. This assures that there will be no leakage of the operating or working fluid past the main piston 20.

In Figure 2, the source of the pressure which acts upon the pressure amplifier is illustrated as the volume tank 24, and in this case any variation in the pressure of the fluid will be automatically taken care of, so that the sealing element will always be urged outwardly by a superior pressure. However, the invention is not to be limited to operating the pressure amplifying device by the same fluid which is employed in the counterbalancing unit, since the pressure being conducted to lines 42 and 43 may be from any desired source.

It is not essential that variations in the counterbalancing fluid be automatically compensated for, and in Figure 5 a modification of the invention is shown. In this form the tube 32 may connect with a conductor 46 which may have the usual check valve fitting 47 at one end thereof. By means of a pressure gun or similar means (not shown), a predetermined pressure may be built up in the line 46, tube 32 and groove 28. A spring-pressed relief valve 48 connected in the line will control the point to which the pressure is built up in the groove. As in the first form, oil or similar noncompressible liquid may be employed as the pressure transmitting medium.

It has been found that in some instances temperature variations may cause expansion and contraction of the liquid within conductor 46, and, if desired, a compensating cylinder 50 may have connection with conductor 46 through a line 51. A spring-pressed compensating piston 52 is disposed within the cylinder 50 and will automatically permit expansion and contraction of the liquid medium.

The main piston 20 of the counterbalancing assembly requires some lubrication, and, where a liquid medium such as oil, which has lubricating qualities, is employed to apply the superior pressure to the sealing element 27, it would be possible to employ this oil as a lubricant. Such arrangement is shown in Figure 6. Referring to this figure, the tube 32, which conducts the liquid-pressure medium to the groove 28, extends outwardly through a coupling 23a in the end of the conduit 23 and has connection with a supply line 53. The supply line communicates with the outlet side of a suitable oil pump 54. A return line 55 connects the inlet side of the pump with the interior of conduit 23. A compensating cylinder 56 is connected through line 57 with the supply line 53 to compensate for expansion and contraction of the liquid due to temperature changes. A lubricating pipe 58 extends from the supply line into conduit 23 and then upwardly through the support 21 into the area B above the piston. A differential valve 59 is connected in pipe 58 and is set to by-pass a predetermined amount of liquid through the pipe 58.

With the pump 54 operating, a pressure which is superior to the pressure of the fluid within conduit 23 is built up and applied through line 53 and tube 32 to the groove 28, whereby the sealing element 27 is urged outwardly into sealing contact with the cylinder wall by a pressure which is greater than the pressure attempting to escape past the element. The differential valve 59 is set to release after the desired pressure is built up in line 53, and thereafter a portion of the lubricant is directed through the pipe 58 and onto the upper surface of piston 20. The upper surface of the piston employed in the form shown in Figure 6 may be recessed as illustrated at 60 to receive and partially retain lubricant. The lubricant will escape from the cylinder and the area above the piston through the bore of the piston and downwardly through the support 21 and will finally flow back into conduit 23, from where it is returned through the return line 55 to the pump. The form shown in Figure 6 has the additional feature of utilizing a portion of the liquid medium for the purpose of lubricating the cylinder wall and main piston.

It has been found that the lubricant or oil which is employed to lubricate the piston and cylinder wall normally builds up in pressure due to the sliding motion of the piston and cylinder with respect to each other. Under certain conditions this oil film pressure between the piston and the cylinder might increase to the point where it would exceed the pressure acting against the interior of the sealing element 27 with the result that the sealing element might be urged inwardly to the extent that excessive leakage past the ring might occur.

In order to relieve any pressure build-up as caused by the oil film, the piston 20 may be provided with a relief groove 61, as shown in Figure 7. This groove is disposed closely adjacent to the groove 28, which receives the sealing element 27 and is located between the sealing element and the upper or pressure end of the piston. Suitable passages 62 establish communication between the relief groove 61 and the area within the upper end of the piston. The groove 61 and passages 62 function to relieve the dynamic pressure in the oil film adjacent the sealing element 27, and, thereby, any effect of oil film pressure upon the sealing element which might interfere with the effective seal is obviated. The relief groove and passages are illustrated in Figure 7 as applied to the particular piston shown in Figure 6, but it is of course, evident that this means for relieving the effect of oil film pressure upon the sealing element is applicable to all forms of the invention.

In all forms of the invention an increased or superior pressure is applied to the sealing element so that the element is maintained in contact with the wall of the cylinder by a force which is in excess of the force produced by the working or operating fluid in the counterbalancing system. This assures an effective seal between the main piston and its cylinder to prevent the escape of the operating or working fluid of said system.

As has been noted, the sealing element 27 may take any desired form, and, so long as it is capable of being urged outwardly into sealing contact with the cylinder wall, the purposes of the invention will be accomplished.

The foregoing disclosure and description of the invention is illustrative and explanatory thereof, and various changes in the size, shape and materials, as well as in the details of the illustrated construction, may be made within the scope of the appended claims without departing from the spirit of the invention.

What is claimed is:

1. In a fluid counterbalancing apparatus for a pumping unit including a relatively movable piston and cylinder one of which is anchored and the other connected to the pumping unit, the improvement comprising an annular sealing element mounted on the piston and having its external peripheral surface in sealing engagement with the wall of the cylinder, means maintaining a fluid pressure within the cylinder and effective against one end of the piston, and means controlled by said cylinder pressure applying a fluid pressure which is greater than the cylinder pressure by a predetermined amount to the inner periphery of the sealing element to urge the element outwardly into sealing position.

2. In a fluid counterbalancing apparatus for a pumping unit including a relatively movable piston and cylinder one of which is anchored and the other connected to the pumping unit, the improvement comprising an annular sealing element mounted on the piston and having its external peripheral surface in sealing engagement with the wall of the cylinder, means maintaining a fluid pressure within the cylinder and effective against one end of the piston, and a fluid motor energized by said cylinder pressure applying a pressure which is greater than the cylinder pressure by a predetermined amount to the inner periphery of the sealing element to urge the element outwardly into sealing position.

3. In a fluid counterbalancing apparatus for a pumping unit including a relatively movable piston and cylinder one of which is anchored and the other connected to the pumping unit, the improvement comprising an annular sealing element mounted on the piston and having its external peripheral surface in sealing engagement with the wall of the cylinder, means maintaining a fluid pressure within the cylinder and effective against one end of the piston, and pump means having its intake connected to the cylinder to obtain fluid under pressure therefrom and its outlet applying pressure to the inner periphery of the sealing element to urge the element outwardly into sealing position.

4. In a fluid counterbalancing apparatus for a pumping unit including a relatively movable piston and cylinder one of which is anchored and the other connected to the pumping unit, the improvement comprising an annular sealing element mounted on the piston and having its external peripheral surface in sealing engagement with the wall of the cylinder, means maintaining a fluid pressure within the cylinder and effective against one end of the piston, pump means having its intake connected to the cylinder to obtain fluid under pressure therefrom and its outlet applying pressure to the inner periphery of the sealing element to urge the element outwardly into sealing position, and a pressure relief valve connecting the outlet of the pump with the cylinder and maintaining pressure behind the piston seal element which is greater than cylinder pressure by a predetermined amount.

References Cited in the file of this patent

UNITED STATES PATENTS

| | | |
|---|---|---|
| 328,613 | Reynolds | Oct. 20, 1885 |
| 528,773 | Ellis | Nov. 6, 1894 |
| 759,659 | Braungart | May 10, 1904 |
| 831,603 | Davis | Sept. 25, 1906 |
| 896,947 | Stallman | Aug. 25, 1908 |
| 1,688,484 | Carter | Oct. 23, 1928 |
| 1,764,458 | McLean | June 17, 1930 |
| 2,124,623 | Kurth | July 26, 1938 |
| 2,233,227 | Ramey et al. | Feb. 25, 1941 |
| 2,293,915 | Patterson | Aug. 25, 1942 |
| 2,349,253 | Edmund | May 23, 1944 |
| 2,665,774 | Patterson | Jan. 12, 1954 |
| 2,665,901 | Patterson | Jan. 12, 1954 |
| 2,745,660 | Delahay | May 15, 1956 |
| 2,745,704 | D'Errico | May 15, 1956 |
| 2,749,193 | Traub | June 5, 1956 |
| 2,775,470 | Bixler et al. | Dec. 25, 1956 |